US006276915B1

(12) United States Patent
Merziger et al.

(10) Patent No.: US 6,276,915 B1
(45) Date of Patent: Aug. 21, 2001

(54) PLANT FOR MANUFACTURING A PLASTIC COMPOSITE PROFILE

(75) Inventors: Joachim Merziger, Nevers; Philippe Mestres, Coulanges les Nevers, both of (FR)

(73) Assignee: Alphacan (FR)

( * ) Notice: Subject to any disclaimer, the term of this patent is extended or adjusted under 35 U.S.C. 154(b) by 0 days.

(21) Appl. No.: 09/141,465

(22) Filed: Aug. 28, 1998

(30) Foreign Application Priority Data

Aug. 29, 1997 (FR) .................................................. 97 10787

(51) Int. Cl.⁷ .................................................. B29C 47/06
(52) U.S. Cl. .................................. 425/133.1; 425/326.1; 425/462; 425/467
(58) Field of Search ................................ 425/133.1, 183, 425/462, 326.1, 467; 264/209.4, 177.1

(56) References Cited

U.S. PATENT DOCUMENTS

| 3,184,792 | * | 5/1965 | Commisso | 18/14 |
| 3,764,642 | | 10/1973 | Boutillier | 264/47 |
| 4,364,882 | | 12/1982 | Doucet | 264/45.9 |
| 4,383,812 | | 5/1983 | Calcagni | 425/133.1 |
| 4,770,618 | * | 9/1988 | Lupke | 425/72.1 |
| 4,808,098 | * | 2/1989 | Chan et al. | 425/72.1 |
| 5,108,682 | * | 4/1992 | Tomkins et al. | 264/167 |
| 5,313,909 | * | 5/1994 | Tseng et al. | 116/208 |
| 5,324,187 | * | 6/1994 | Cook | 425/131.1 |
| 5,449,281 | * | 9/1995 | Dupart et al. | 425/131.1 |
| 5,516,472 | | 5/1996 | Laver | 264/118 |
| 5,626,807 | * | 5/1997 | O'Halloran | 264/148 |
| 5,667,818 | * | 9/1997 | Guillemette | 425/133.1 |
| 5,672,303 | * | 9/1997 | Metzger et al. | 264/75 |
| 5,686,128 | * | 11/1997 | Tracy et al. | 426/284 |
| 5,733,491 | | 3/1998 | Grosset et al. | 264/172.1 |

FOREIGN PATENT DOCUMENTS

| 28 44 014 A | 4/1980 | (DE) . |
| A 1498620 | 10/1967 | (FR) . |
| 03 240515 A | 10/1991 | (JP) . |

OTHER PUBLICATIONS

Wilschut, J., "Inzamelen Terugkerend Materiaal Moet Nog Geoptimaliseerd. Nieuwe PVC–Kozijnen Uit 'Oud' Materiaal", Bouwwereld, vol. 89, No. 1, Jan. 8, 1993, p. 47, XP000328393 (with English translation).

* cited by examiner

Primary Examiner—Nam Nguyen
Assistant Examiner—Joseph S Del Sole
(74) Attorney, Agent, or Firm—Pennie & Edmonds LLP

(57) ABSTRACT

The present invention is directed to a plant for performing a process for manufacturing a plastic composite profile of any cross section, having an outer layer or skin made of a first material and at least one inner layer made of a different material suitable for adhering to the skin, according to which process the materials of the profile are coextruded. In a first step, a cylindrical bead of solid cross section is produced using a coextrusion unit, in which bead the skin material forms an outer ring whereas the material of the inner layer forms the core; and, downstream of the coextrusion unit, the cross section of the cylindrical bead is gradually converted in a simple extrusion head, of the kind used for single-material profiles, into the desired section for the profile, in such a way that the skin remains present, with a minimal thickness, at least on all the essential parts of the completed profile.

9 Claims, 3 Drawing Sheets

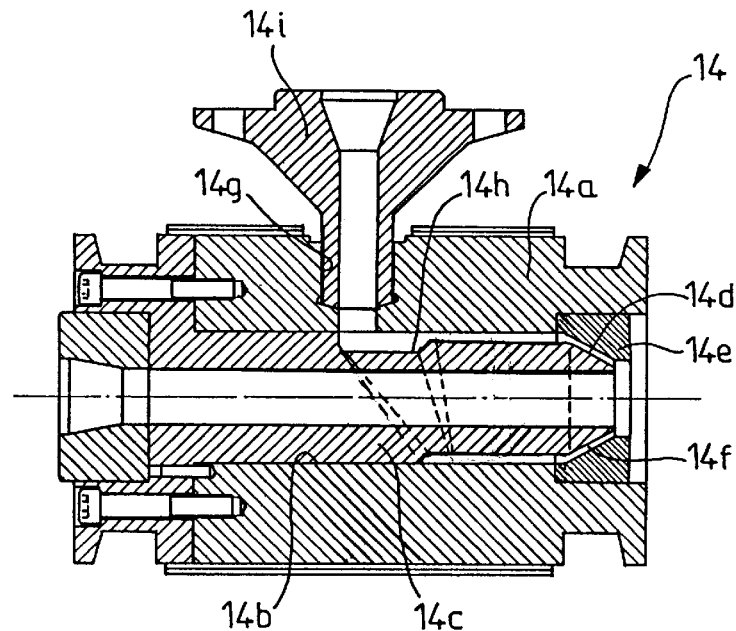
FIG.6
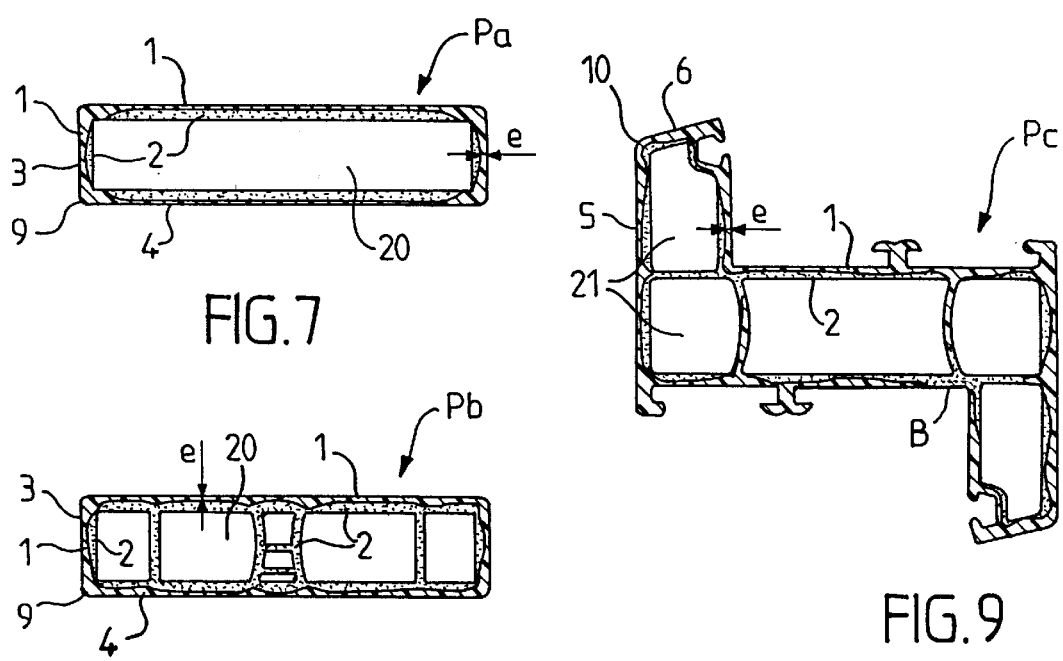
FIG.7
FIG.8
FIG.9
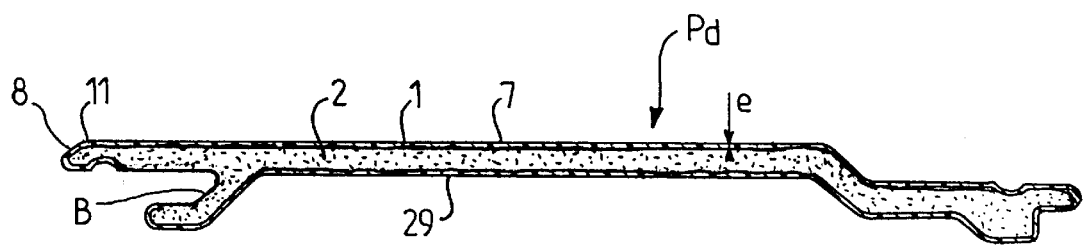
FIG.10

PLANT FOR MANUFACTURING A PLASTIC COMPOSITE PROFILE

BACKGROUND OF THE PRESENT INVENTION

1. Field of the Invention

The invention relates to a process for manufacturing a plastic composite profile, of any cross section, having an outer layer or skin made of a first material and at least one inner layer made of a different material suitable for adhering to the skin, according to which process the materials of the profile are coextruded.

The invention relates especially to the manufacture of profiles with a prismatic surface, having differently oriented plane faces joined together in arcs of low radius of curvature, the outline of the cross section of the profile having the shape of a convex, or concave, or convex and concave polygon. The reader is reminded that a polygon is a figure formed by an ordered sequence of segments or sides, each of which has one end common with the previous one and with the following one.

The invention relates more particularly, but not exclusively, to the manufacture of profiles used in the construction industry, for example for door frames, window frames, partition elements and wall coverings.

2. Description of Related Art

A process of this kind is known from document FR-A-2, 470,672. This process uses a complex coextrusion head comprising two extrusion nozzles, the cross sections of which have shapes identical or similar to those of the desired sections for the various materials in the completed profile.

The coextrusion head is specific to a particular profile. It is therefore necessary to have as many coextrusion heads as types of profiles to be manufactured.

Now, a coextrusion head comprising at least two nozzles, and sometimes more, for the inlet of different materials is expensive. This entails considerable investment when there are many different sections of profiles to be produced.

Moreover, it is known to manufacture plastic tubes with a composite wall, as taught for example by FR-A-2,455,972, but this document does not provide for the manufacture of profiles with a prismatic surface and with a composite wall.

SUMMARY OF THE INVENTION

First and foremost, the object of the invention is to provide a process for manufacturing a plastic profile with a composite wall which is more flexible than the processes known hitherto and which allows a large number of profiles of different sections to be manufactured with lower investment costs.

It is also desirable for the process to be able to combine at least two layers of material making a particular contribution to the properties of the final profile: for example, a saving by the use of a less expensive material for the inner layer than that for the skin, and/or an improvement in the thermal insulation properties by using a core foamed or cellularized material for the inner layer, while still obtaining the desired properties on the surface (for example, resistance to UV radiation, color, surface hardness, etc.) by a suitable formulation of the material of the external layer or skin.

DESCRIPTION OF THE DRAWINGS

FIG. 6 is an axial section through the coextrusion unit according to the invention.

FIG. 7 is a cross section of a hollow profile, with an approximately rectangular section, obtained using a cylindrical bead.

FIG. 8 is a cross section of an alternative form of the hollow profile shown in FIG. 7.

FIG. 9 is a cross section of another profile obtained using a cylindrical bead having a section according to FIG. 3.

FIG. 10 is a cross section of another profile which can serve as a wall covering element.

Finally.

DESCRIPTION OF THE PREFERRED EMBODIMENTS

Figure 1:
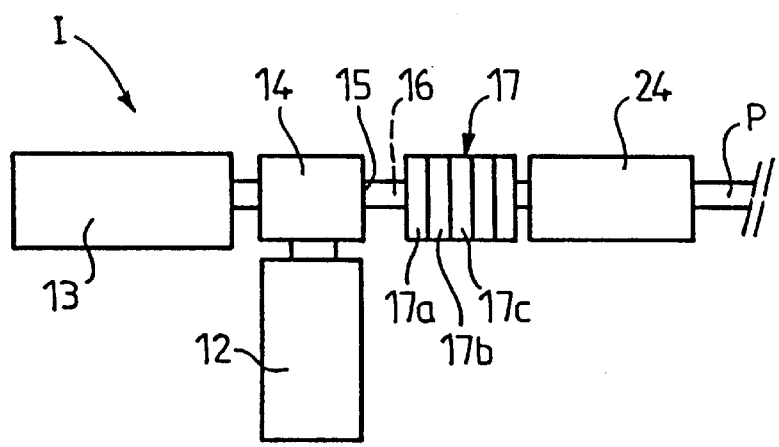
FIG. 1 in these drawings is a diagram of a plant according to the invention for the manufacture of a plastic profile with a composite wall.

According to the invention, a process for manufacturing a plastic profile with a composite wall, of the kind defined above, is characterized in that:

in a first step, a solid cylindrical bead, for example with a circular external outline, is produced using a coextrusion unit, in which bead the skin material forms an outer ring while the material of the inner layer forms the core; and downstream of the coextrusion unit, the cross section of the cylindrical bead is gradually converted using a simple extrusion head into the desired section for the profile, in such a way that the skin remains present at least on all the essential parts of the completed profile.

The expression "simple extrusion head" is understood to mean an extrusion head of the kind used for manufacturing single-material profiles.

According to the invention, the coextrusion unit is easy to produce, and is therefore relatively inexpensive, since it serves for making a two-material solid cylinder, whatever the shape of the cross section created by the extrusion head which follows, the latter being less expensive than the complex coextrusion heads of the prior art.

Thus, according to the process of the invention, to change the shape of the cross section of the profile, within defined limits, does not require changing the coextrusion unit. All that is required is to fit the intended means to the output end of this coextrusion unit in order to ensure the gradual conversion of the section of the bead into the desired section for the profile.

The cylinder output by the coextrusion unit does not necessarily have a circular section and may have an oval section or a section in the form of an ellipse. Preferably, sharp corners or angles in the section of the bead are avoided as they cause material stagnation.

The solid section of the bead output by the coextrusion unit may, firstly, be converted into an annular section, the central part being filled with a mandrel, before it reaches the coextrusion head.

The bead output by the coextrusion unit may have an internal layer of solid cross section with an approximately elliptical outline so that two diametrically opposed regions of the outer layer of the bead have a smaller thickness, these regions being called upon to correspond to short sides of the cross section of the completed profile.

The invention also relates to a plant for the implementation of the process defined above, this plant comprising a first extruder for the skin material and a second extruder for the material of the inner layer; according to the invention, a coextrusion unit is connected to the output ends of the two extruders and is suitable for providing, as output, a cylindrical bead of solid section, for example having a circular or approximately circular outer contour, which includes an outer layer and an inner layer, and this unit is followed by a simple extrusion head suitable for gradually changing the section of the cylindrical bead to a section whose shape is that desired for the profile, while at the same time ensuring that there is a thickness of skin on at least all the essential parts of the completed profile.

The coextrusion unit comprises a body through which an axial bore passes, a nozzle having a central channel which is fed by an extruder for forming the core of the composite bead being mounted in the said axial bore. That end of the nozzle lying on the output side of the unit has a frustoconical outer surface which defines, together with an approximately parallel frustoconical surface of a counter-piece, a frustoconical annular passage, which converges toward the output end, for the skin material.

Preferably, the extrusion head is composed of several stacked extrusion plates, each plate having a die defining a cross-sectional shape which increasingly approaches the desired section for the profile on moving further away from the coextrusion unit.

Advantageously, the plant includes, downstream of the extrusion head, a sizing unit, in particular a cooled sizing unit, suitable for freezing the skin of the profile, while the inner layer may, depending on the case, undergo expansion inside the skin.

The invention also relates to a plastic profile with a composite wall, having any cross section, comprising an outer layer or skin made of a first material and an inner layer made of a second material suitable for adhering to the skin, which profile is especially obtained by the process of the invention, characterized in that the thickness of the skin varies over the outline of the cross section.

In particular, this thickness is greater in the regions of small transverse dimension of the completed profile than in the regions of large transverse dimension.

Nonessential parts of the profile may be devoid of skin, the inner layer coming to the surface.

Advantageously, the material of the inner layer is less expensive than that of the skin.

Depending on the case, the material of the inner layer may be chosen to provide properties lacking in the outer layer, which is chosen mainly for its aesthetic appearance; in particular, the inner layer may be made of cellular foam in order to improve the thermal and/or acoustic insulation.

Apart from the arrangements explained above, the invention consists of a certain number of other arrangements which will be explained in greater detail below with regard to illustrative embodiments which are described with reference to the drawings appended hereto but which are entirely non-limiting.

Referring to the drawings, especially to FIG. 1, a plant 1 may be seen for manufacturing a plastic, more especially a thermoplastic, profile P with a composite wall, having any cross section.

FIGS. 7 to 11 give examples of possible cross sections for profiles Pa, Pb, Pc, Pd and Pe.

The profile with a composite wall comprises an outer layer or skin 1 made of a first material and at least one inner layer 2 made of second material suitable for adhering to the skin 1.

The profile, such as Pa, Pb, Pc, Pd and Pe, generally has a prismatic shape of polygonal section with convex and/or concave parts. The profile has differently oriented plane faces such as the faces 3 and 4 for the profiles Pa, Pb, the faces 5 and 6 for the profile Pc and the faces 7 and 8 for the profile Pd. These plane faces are joined together in arcs 9, 10 or 11 of small radius of curvature. The expression "small radius of curvature" is understood to mean arcs 9, 10 and 11 whose average radius of curvature is markedly less than the radius of the circle circumscribing the cross section of the profile in question, in particular less than a tenth of this radius of the circumscribing circle, but this value is in no way limiting.

The profile such as Pe (FIG. 11) has a prismatic shape with a nonstraight face 30 of large radius of curvature. Depending on the desired range of profiles, it may have several non-straight faces.

The plant 1 comprises a first extruder 12 for the skin material 1 and a second extruder 13 for the inner layer. The profile P is output along the direction of the axis of the second extruder 13. The axes of the two extruders may be placed at right angles, as illustrated in FIG. 1.

Figure 3:
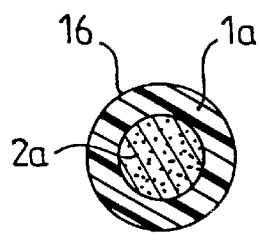
FIG. 3 is a cross section, on a larger scale, of the plastic bead output by the coextrusion unit before it enters the tooling.

According to the invention, a coextrusion unit 14 is connected to the output ends of the two extruders. This unit 14 provides, at its output end 15, a composite cylindrical bead 16 (FIG. 3) of solid section, for example with a circular or approximately circular outline, comprising at least two, and in particular concentric, layers 1a, 2a.

As may be seen in FIG. 6, the unit 14 comprises a body 14a through which an axial bore 14b passes, a nozzle 14c having a central channel which is fed by the extruder 13 for forming the core 2a of the composite bead being mounted in the said axial bore 14b. That end of the nozzle 14c lying on the output side of the unit has a frustoconical outer surface 14d which defines, together with an approximately parallel frustoconical surface of a counter-piece 14e, a frustoconical annular passage 14f, converging toward the output end. A hole 14g is provided in the body 14a and emerges in the bore 14b near a groove 14h. This groove 14h is joined to the passage 14f. A piece 14i is engaged in the hole 14g in order to feed this hole with the skin material coming from the extruder 12.

The unit 14 is followed by a simple extrusion head 17, suitable for gradually converting the solid section of the cylindrical bead 16 into a section whose shape is that desired for the profile, for example as illustrated in FIGS. 7 to 11, while at the same time ensuring that there is a skin of thickness e on all the essential parts of the completed profile.

Despite the considerable difference between the shape of the section of the cylindrical bead 16 and that of the section of the completed profile Pa, Pb, Pc, Pd, Pe, it is possible to obtain, according to the invention, a profile with a composite wall having a skin 1 at least on the essential parts of the profile.

To achieve this surprising result, it was firstly necessary to overcome the prejudice which considered that it was impossible to go from the section of the cylindrical bead 16 to that of the very different completed profile, with variously oriented plane or non-plane faces, without extensive fracture of the outer layer 1a.

Figure 4:
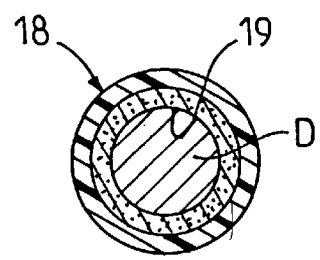
FIG. 4 is a cross section showing a conversion of the section shown in FIG. 3.

In an intermediate step, the cylindrical bead 16 of solid section may be converted, before the bead reaches the extrusion head 17, into a composite cylindrical tubular bead 18 (FIG. 4) with coaxial walls, the inner layer being formed by a ring surrounding a space 19 which is devoid of plastic but is filled by a metal mandrel D. This tubular bead 18 is produced conventionally by positioning the tool or mandrel D coaxially with the bead 16 along its path on leaving the unit 14.

Figure 11:
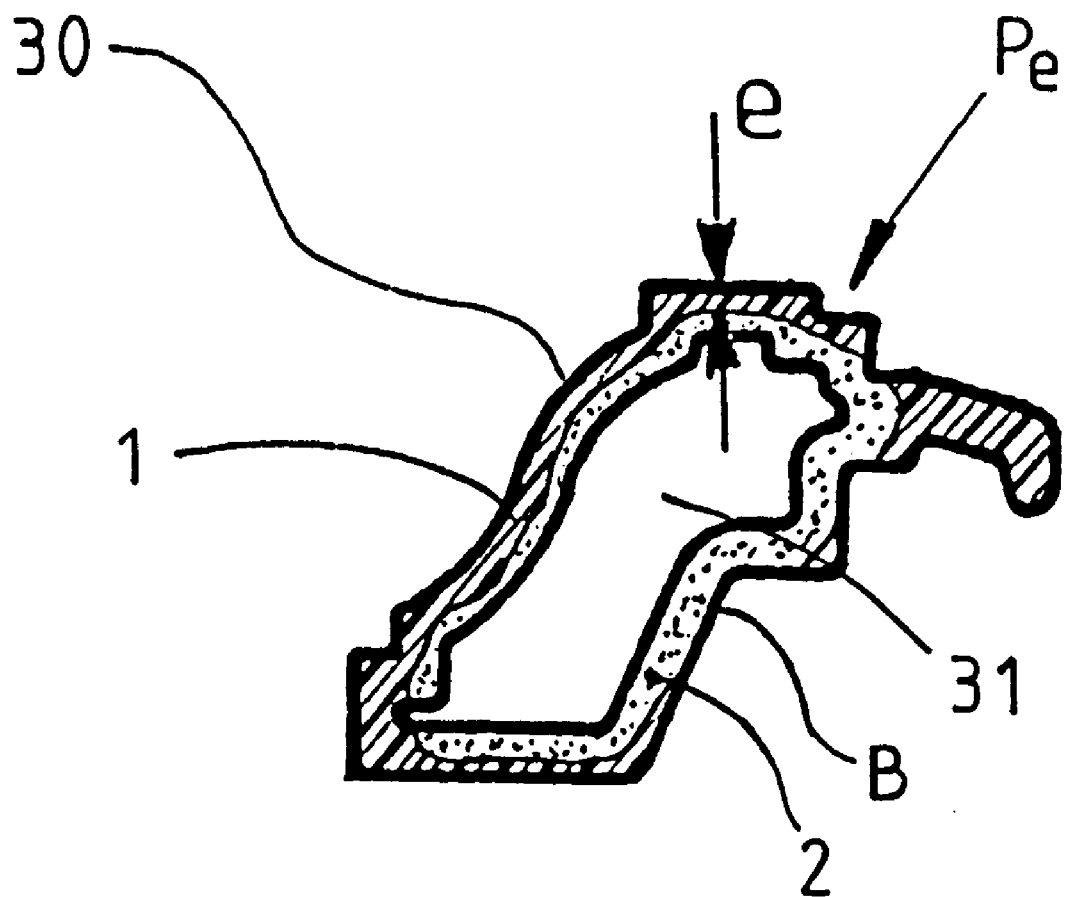
FIG. 11 is a cross section of an alternative form of profile.

The extrusion head 17 preferably consists of several plates 17a, 17b, 17c, etc. juxtaposed in a direction parallel to the direction of advance of the bead 16 and of the profile P. Each plate 17a, 17b, 17c, etc. has a die defining a sectional shape which increasingly approaches the desired section for the profile P on moving further away from the coextrusion unit 14. Mandrels are suitably positioned in the plates 17a, 17b, etc. when the profile has to have hollow spaces such as 20 (FIGS. 7 and 8), 21 (FIG. 9) or 31 (FIG. 11).

In the plant of the invention, the coextrusion unit 14 can remain unchanged in the case of profiles P of highly diverse sections. All that is required is to change the tooling formed by the extrusion head 17 or some of the plates in this tooling in order to obtain, as output, the desired profile from the same cylindrical input bead 16. This results in a substantial saving in investment since the unit 14 may serve to manufacture several profile sections and since modifications to the single-material extrusion heads 17 are much less expensive than modifications to complex coextrusion heads.

Figure 5:
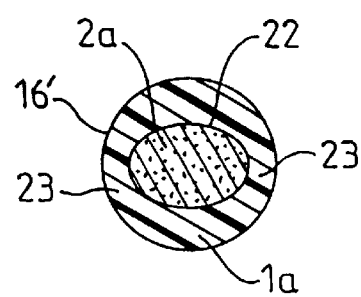
FIG. 5 is an alternative form of the cross section of the plastic bead output by the coextrusion unit.

In addition, if the simple extrusion heads are already in possession of the extruder, this coextrusion unit enables them to be used to manufacture coextruded profiles Tests have shown that, when converting the solid section of the cylindrical bead 16 into a polygonal section, for example such as that of the profile Pa, Pb or Pc shown in FIGS. 7, 8 or 9, the thickness of the skin 1 is variable and irregular around the outline of the cross-section, as may be seen in the drawing. In particular, the skin 1 is thicker on the faces, such as 5, of small transverse dimension than on the faces 6 of large transverse dimension. To reduce this effect, a unit 14 may be provided which outputs a cylindrical bead 16' (FIG. 5) whose external outline is circular, whereas the outline 22 of the inner layer 2a is approximately elliptical with its major axis oriented so that the thickness of the skin la in the bead 16' is minimal in opposed regions such as 23, to which the small faces, such as 5, of the completed profile correspond.

Figure 2:
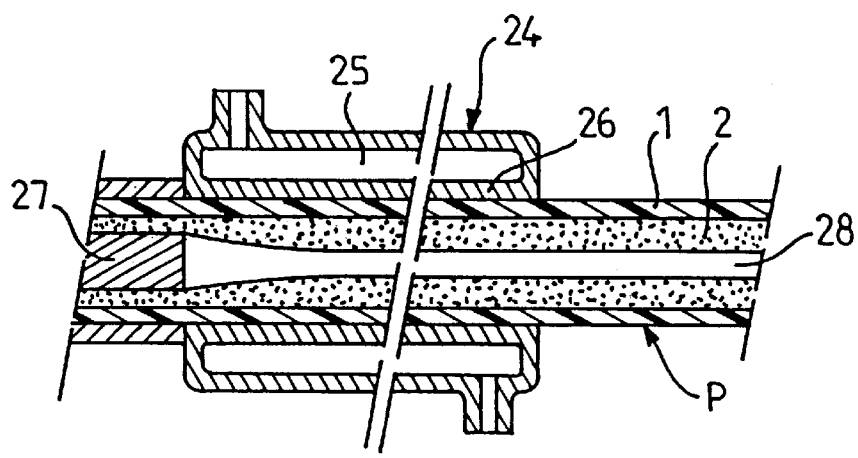
FIG. 2 is a sectional diagram, on a larger scale, of the sizing unit or sizing rig shown in FIG. 1.

The extrusion head 17 is followed by a sizing unit 24 or sizing rig, as shown for example in document FR-A-1,498, 620 and illustrated in greater detail in FIG. 2.

The plastic in the extruders, in the coextrusion unit 14 and in the extrusion head 17 is worked hot at a temperature appropriate to the thermoplastic used. For example in the case of PVC, the temperature in the unit 14 and the extrusion head 17 may be about 190° C. On the other hand, the sizing unit 24 is maintained at a relatively low temperature, of about 15° C., by circulating cooling water in an annular chamber 25 surrounding a sleeve 26 against which the skin 1 of the profile P is in contact. The skin 1 freezes on contacting the cold wall 26.

On leaving the extrusion head 17, the inner layer 2 is no longer contained by a tool or mandrel 27, the volume inside the sleeve 26 being completely open. Depending on the material used for the inner layer 2, this layer may undergo expansion on leaving the extrusion head 17, in the sizing unit 24, with a change of density, in order to give a cellular foam. The expansion of the layer 2, shown diagrammatically in FIG. 2, may be limited so that a hollow space 28 remains inside the profile P.

As illustrated in FIGS. 7 and 8, the compact PVC inner layer 2 may have a relatively small thickness.

The two layers 1 and 2 of the completed profile are chosen so as to be compatible and to make a particular contribution to the properties of this profile. For example, a cost saving may be made by using a less expensive material for the inner layer 2 than for the layer 1, which however does give the profile an attractive appearance, at least in its essential parts when it is present. According to another possibility, capable of being combined with the previous one, the thermal insulation properties of the profile are improved by using a core foamed or cellularized material for the inner layer 2 and/or expected surface properties (resistance to UV radiation, color, surface hardness, etc.) are obtained by a suitable formulation of the material of the external layer 1.

FIGS. 9 and 11 diagrammatically illustrate sections of profiles Pc and Pe which can be used for door frames or window frames. Nonessential parts of the profile, especially parts which are not visible, such as the parts B, are devoid of skin, the core material coming to the surface.

The profile Pa shown in FIG. 7 corresponds to a hollow box of rectangular section.

The profile Pb shown in FIG. 8 is similar on the outside to the profile Pa shown in FIG. 7 but, on the inside, it includes longitudinal webs forming stiffening braces made of the core material.

The profile Pd shown in FIG. 10 corresponds to a wall covering element provided for fitting into similar adjacent elements; the large dimension of the element Pc is perpendicular to the plane of FIG. 10 and is generally positioned vertically when this profile, whose visible outer face 7 lies in the top part of FIG. 10, is put into place. With such a profile, for example, the skin 1 could be partially absent on the inner face 29 which is not visible when this profile is in place.

Of course, the invention is not limited to the case in which the skin 1 is made of compact PVC and the inner layer 2 of cellular PVC, or PVC of inexpensive formulation. It is possible to work with other materials, for example with polyethylene, PMMA (polymethyl methacrylate) or ABS (acrylonitrile-butadiene-styrene), optionally combining them together if they are compatible.

The invention provides a considerable economic advantage since it is not necessary to change the coextrusion unit each time the profile crosssection is changed, as this coextrusion unit is of relatively inexpensive construction, and as the final extrusion head is a simple and conventional head such as those used for single-material profiles.

What is claimed is:

1. A plant for implementing a process for manufacturing a plastic composite profile having an outer layer or skin made of a first material and at least one inner layer made of a second material suitable for adhering to the skin, wherein the layers are coextruded, said plant comprising:

a first extruder for the first material and a second extruder for the second material;

a coextrusion unit connected to output ends of the first and second extruders that extrudes, as output, a cylindrical bead of solid section, having the outer layer made of the first material and the inner layer made of the second material; and an extrusion head located downstream of the unit for gradually changing said cylindrical bead of solid section to the plastic composite profile such that the plastic composite profile has a generally prismatic shape of polygonal section with convex and/or concave parts.

2. The plant according to claim 1, characterized in that the coextrusion unit comprises a body through which an axial bore passes, a nozzle having a central channel which is fed by an extuder for forming the core of the composite bead being mounted in the said axial bore.

3. The plant according to claim 2, characterized in that an end of the nozzle lying on an output side of the coextrusion unit has a frustoconical outer surface which defines, together with a frustoconical surface of a counter-piece, a frustoconical annular passage, which converges toward an output end, for the first material.

4. The plant according to claim 3, characterized in that a hole is provided in the body and emerges in the bore near a groove on an outer surface of the nozzle.

5. The plant according to claim 1, characterized in that the extrusion head is composed of a plurality of stacked plates, each plate having a die defining a cross-sectional shape which increasingly approaches the desired section for the profile on moving further away from the coextrusion unit.

6. The plant according to claim 1, characterized in that it includes, downstream of the extrusion head, a sizing unit comprising an annular chamber, in which cooling water can circulate, surrounding a sleeve against which the skin of the profile is in contact with to freeze the skin of the profile, while the inner layer may, depending on the case, undergo expansion inside the skin.

7. The plant according to claim 1, wherein an external outline of the coextrusion unit is circular whereas an outline of the inner layer is elliptical with its major axis oriented so that thickness of the outer layer is minimal in opposed regions to which small faces of the plastic composite profile correspond.

8. The plant according to claim 1, wherein an external outline of the coextrusion unit is circular and whereas an outline of the inner layer is elliptical so that the outer layer of the plastic composite profile is irregular in its thickness but still exists in any cross-section of the plastic composite profile.

9. The plant according to claim 1, wherein a mandrel is located coaxially with the bead along its path on leaving the coextrusion unit and upstream of the extrusion head.

* * * * *